(12) United States Patent
Takada et al.

(10) Patent No.: US 10,222,107 B2
(45) Date of Patent: Mar. 5, 2019

(54) THROTTLE DEVICE AND REFRIGERATION CYCLE SYSTEM WITH SAME

(71) Applicant: SAGINOMIYA SEISAKUSHO, INC., Tokyo (JP)

(72) Inventors: Yasumasa Takada, Sayama (JP); Junichi Yokota, Sayama (JP); Yoshihisa Arai, Sayama (JP); Yuichiro Toyama, Sayama (JP); Hiroki Denda, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 0 days.

(21) Appl. No.: 15/577,265

(22) PCT Filed: Jun. 2, 2016

(86) PCT No.: PCT/JP2016/002691
§ 371 (c)(1),
(2) Date: Nov. 27, 2017

(87) PCT Pub. No.: WO2016/194388
PCT Pub. Date: Dec. 8, 2016

(65) Prior Publication Data
US 2018/0149395 A1     May 31, 2018

(30) Foreign Application Priority Data

Jun. 3, 2015    (JP) ................................. 2015-113264
Sep. 4, 2015    (JP) ................................. 2015-175122

(51) Int. Cl.
*F16K 1/00*      (2006.01)
*F25B 1/00*      (2006.01)
(Continued)

(52) U.S. Cl.
CPC .............. *F25B 41/062* (2013.01); *F16K 1/00* (2013.01); *F16K 17/30* (2013.01); *F16K 47/04* (2013.01);
(Continued)

(58) Field of Classification Search
CPC .......... F25B 41/062; F25B 1/00; F25B 41/06; F16K 17/30; F16K 47/04; F16K 1/00
See application file for complete search history.

(56) References Cited

U.S. PATENT DOCUMENTS 3,372,902 A *   3/1968   Gotzenberger ........... F16K 1/38
                                                                                251/149.6
5,172,720 A     12/1992   Richards
(Continued)

FOREIGN PATENT DOCUMENTS

CN          1690600 A     11/2005
CN          1914466 A      2/2007
(Continued)

OTHER PUBLICATIONS

International Search Report dated Aug. 23, 2016, issued in PCT Application No. PCT/JP2016/002691, filed Jun. 2, 2016.
(Continued)

*Primary Examiner* — Elizabeth J Martin

(57) ABSTRACT

In a throttle device, a guide section including a small-diameter hole which slidably guides a guide stem of a needle member is formed upstream side portion from a communicating hole in a guide tube.

8 Claims, 16 Drawing Sheets

(51) Int. Cl.
　　　*F16K 17/30*　　　(2006.01)
　　　*F16K 47/04*　　　(2006.01)
　　　*F25B 41/06*　　　(2006.01)
(52) U.S. Cl.
　　　CPC ................ *F25B 1/00* (2013.01); *F25B 41/06*
　　　　　　　　　　(2013.01); *F25B 2341/06* (2013.01)

(56) References Cited

U.S. PATENT DOCUMENTS

| | | | |
|---|---|---|---|
| 6,532,764 B1 | 3/2003 | Hirota et al. | |
| 2005/0198979 A1* | 9/2005 | Robin ..................... | F25B 9/008 62/222 |
| 2007/0157661 A1* | 7/2007 | Yukimoto ............ | F25B 41/062 62/527 |

FOREIGN PATENT DOCUMENTS

| | | | |
|---|---|---|---|
| JP | 2000-154952 A | 6/2000 |
| JP | 3528433 A | 3/2004 |
| JP | 2005-249380 A | 9/2005 |

OTHER PUBLICATIONS

International Preliminary Report on Patentability dated Dec. 14, 2017, issued in PCT Application No. PCT/JP2016/002691, filed Jun. 2, 2016.
Extended European Search Report dated Mar. 26, 2018, issued in European Application No. 16802828.0.
Office Action dated Oct. 31, 2018 in corresponding CN Patent Application No. 201680031161.4.

* cited by examiner

THROTTLE DEVICE AND REFRIGERATION CYCLE SYSTEM WITH SAME

TECHNICAL FIELD

The invention relates to a throttle device and a refrigeration cycle system with the same.

BACKGROUND ART

For refrigeration cycle systems in air conditioners, there has been proposed that a refrigeration cycle system is provided with a differential pressure-type throttle device instead of a capillary tube as a throttle device. The differential pressure-type throttle device is configured to optimally control a pressure of a refrigerant between an outlet of a condenser and an inlet of an evaporator in order to efficiently operate a compressor in accordance with an outside air temperature. Moreover, in a refrigeration cycle system in which a number of revolutions of the compressor is variable, the differential pressure-type throttle device is also configured to optimally control the pressure of the refrigerant according to the number of revolutions of the compressor from the labor saving point of view. For example, an end of the throttle device to which the refrigerant is introduced is joined to a primary duct connected to the condenser while the other end of the throttle device from which the refrigerant is discharged is joined to a secondary duct connected to the evaporator.

As illustrated in Patent Document 1, for example, the differential pressure-type throttle device comprises: a valve body adjusting the degree of opening on the valve opening of a housing; a guide skirt which has a plurality of holes and guides movement of the valve body; and a coil spring which urges the valve body toward space of the inlet port of the housing. The aforementioned valve opening of the housing is connected to a condenser (a radiator) while an outflow port of the housing is connected to the evaporator.

A portion of the aforementioned guide skirt around the valve body is provide with a plurality of holes constituting a flow channel of the refrigerant. The guide skirt guides movement of the valve body against the urging force of the coil spring through the cylinder outer side surface of the guide skirt extending toward the outflow port of the housing being brought into contact with the inner wall of the housing. Hereby, the valve body stops at the position where forces acting on the valve body through the valve opening of the housing and the outflow port of the housing are balanced. Accordingly, the degree of opening on the valve opening is determined by elastic force that the coil spring gives to the valve body.

PRIOR ART DOCUMENTS

Patent Document

Patent Document 1: Japanese Patent No. 3528433

SUMMARY OF INVENTION

In such a differential pressure-type throttle device as described above, a state of the refrigerant is in a relatively unstable liquid-gas phase at downstream side of the valve opening of the housing. In this case, eluted substances which are eluted and formed from the components contained in the refrigerant or refrigerator oil, abrasion powder, compounds of the eluted substances and abrasion powder, or the like may adhere and deposit in part where the cylinder outer side surface of the guide skirt forming downstream portion of the valve opening of the housing is brought into contact with the inner wall of the housing by an operation for a relatively long period. Such eluted substances and abrasion powder that act as a resistance to sliding of the guide skirt adversely affect the flow rate characteristic of the throttle device.

In view of the above-described problem, the present invention aims to provide a throttle device and a refrigeration cycle system with the same.

The throttle device and the refrigeration cycle system with the same can prevent foreign substances, such as substances eluted from components contained in a refrigerant or refrigerator oil, abrasion powder, or compounds of the eluted substances and abrasion powder, from adhering to a part located downstream side of the valve opening.

To achieve the above-described object, a throttle device according to the present invention comprises: a tube body which is provided in a duct supplying a refrigerant and has opening end sections at both ends, the opening end sections communicating with the inside of the duct; a valve seat which is provided on an inner circumferential part of the tube body and has a valve port; a valve member including: a valve section which is provided to be movable toward and away from the valve port of the valve seat and controls an opening area of the valve port; and a guide stem section which is continuous with the valve section and extends toward an upstream side in a flow of the refrigerant; a urging member which urges the valve member in a direction toward the valve port of the valve seat; and a guide section which is provided upstream side of the position of the valve port in the flow of the refrigerant within the tube body and on which the guide stem section of the valve member is slidably provided.

The urging member may be provided at upstream side portion of the valve port.

Another throttle device according to the present invention includes: a tube body which is provided in a duct supplying a refrigerant and has opening end sections at both ends, the opening end sections communicating with the inside of the duct; a valve seat which is provided on an inner circumferential part of the tube body and includes a valve port; a needle member including: a tapered section which is provided to be movable toward and away from the valve port of the valve seat and controls the opening area of the valve port; and a guide stem section which is continuous with a distal end of the tapered section and away from the valve port and extends toward an upstream side in a flow of the refrigerant; an urging member which is provided between the needle member and one of the opening end sections of the tube body and urges the needle member in a direction toward the valve port of the valve seat; and a guide section which is fixed to the inner circumferential part of the tube body at an upstream side of the valve seat in the flow of the refrigerant and on which the guide stem section of the needle member is slidably provided.

The needle member may further include a overhang section which is formed at a proximal end of the tapered section to extend perpendicularly to a direction of the flow of the refrigerant and on which pressure of the refrigerant acts in a direction perpendicular to the a direction of the flow of the refrigerant. Moreover, the throttle device may further include a communicating hole which is formed in the guide section and allows the valve port to communicate with a gap between an outer circumferential part of the guide section and an inner circumferential part of the tube body, in which at least the guide section, valve seat, and communicating hole are integrally formed in a guide tube provided in the inner circumferential part of the tube body.

A stopper member including an end portion which touches on an end face of the guide stem section of the needle member may be provided at an end of the guide section. Moreover, the throttle device may produce a difference in pressure between pressure in a first gap and pressure in a second gap, the first gap formed between a first end of the overhang section of the needle member, which extends perpendicularly to the direction of the flow of the refrigerant, and the inner circumferential part of the tube body, and the second gap formed between a second end of the overhang section of the needle member which faces the first end of the overhang section of the needle member and the inner circumferential part of the tube body. A small-diameter hole of the guide section in which the guide stem section of the needle member is inserted may have the same diameter as the valve port of the valve seat each other.

A stopper member is provided at the guide section, the stopper member including an inner surface which touches on the end face of the guide stem section of the valve member and covers the urging member and a support member supporting the urging member.

A refrigeration cycle system according to the present invention includes an evaporator, a compressor, and a condenser, in which the aforementioned throttle device is provided in a duct located between the outlet of the condenser and the inlet of the evaporator.

Advantageous Effects of Invention

With the throttle device according to the present invention and the refrigeration cycle system including the same, the needle member includes the guide stem section which is away from the valve port and extends continuously from the tip end of the tapered section toward the upstream side in the flow of the refrigerant. The guide section is fixed to the inner circumferential part of the tube body at the position upstream of the valve seat in the flow of the refrigerant, and the guide stem section of the needle member is slidably provided on the guide section. The guide section at which the components slide on each other is therefore located within a liquid refrigerant having a comparatively stable refrigerant state. This reduces abrasion powder and prevents substances which are eluted from the components contained in the refrigerant or refrigerator oil, abrasion powder, or compounds of the eluted substances and abrasion powder from adhering to or depositing on the guide section. It is therefore possible to prevent foreign substances from adhering to part where components slide on each other.

DESCRIPTION OF EMBODIMENTS

Figure 1:
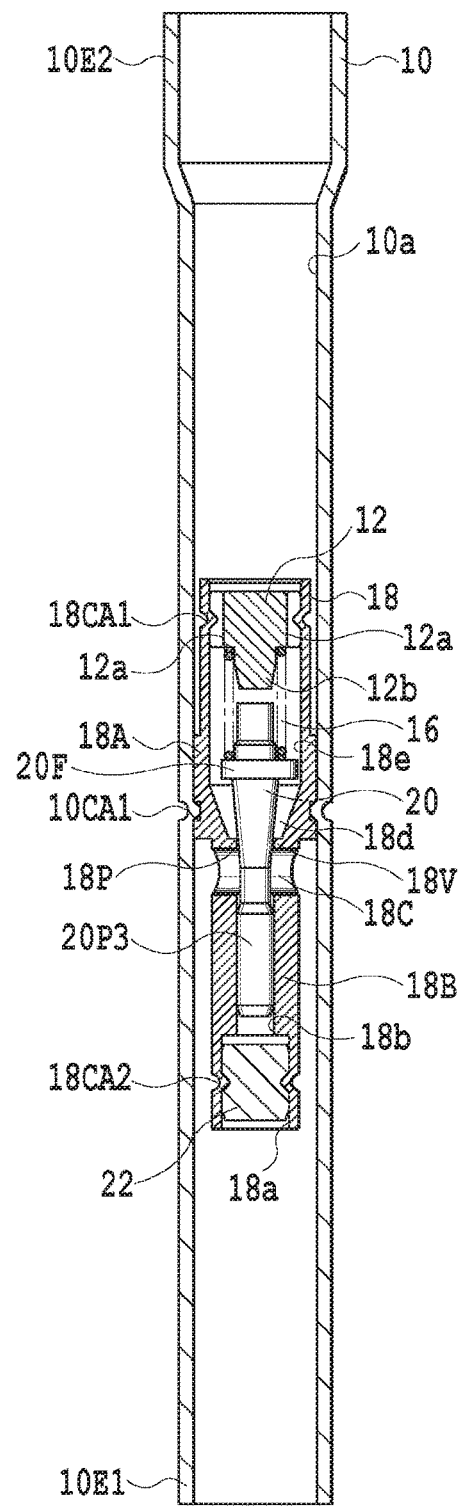
FIG. 1 is a cross-sectional view illustrating the configuration of a first embodiment of a throttle device according to the present invention.

FIG. 1 illustrates the configuration of a first embodiment of a throttle device according to the invention which is applied to an example of a refrigeration cycle system.

Figure 2:
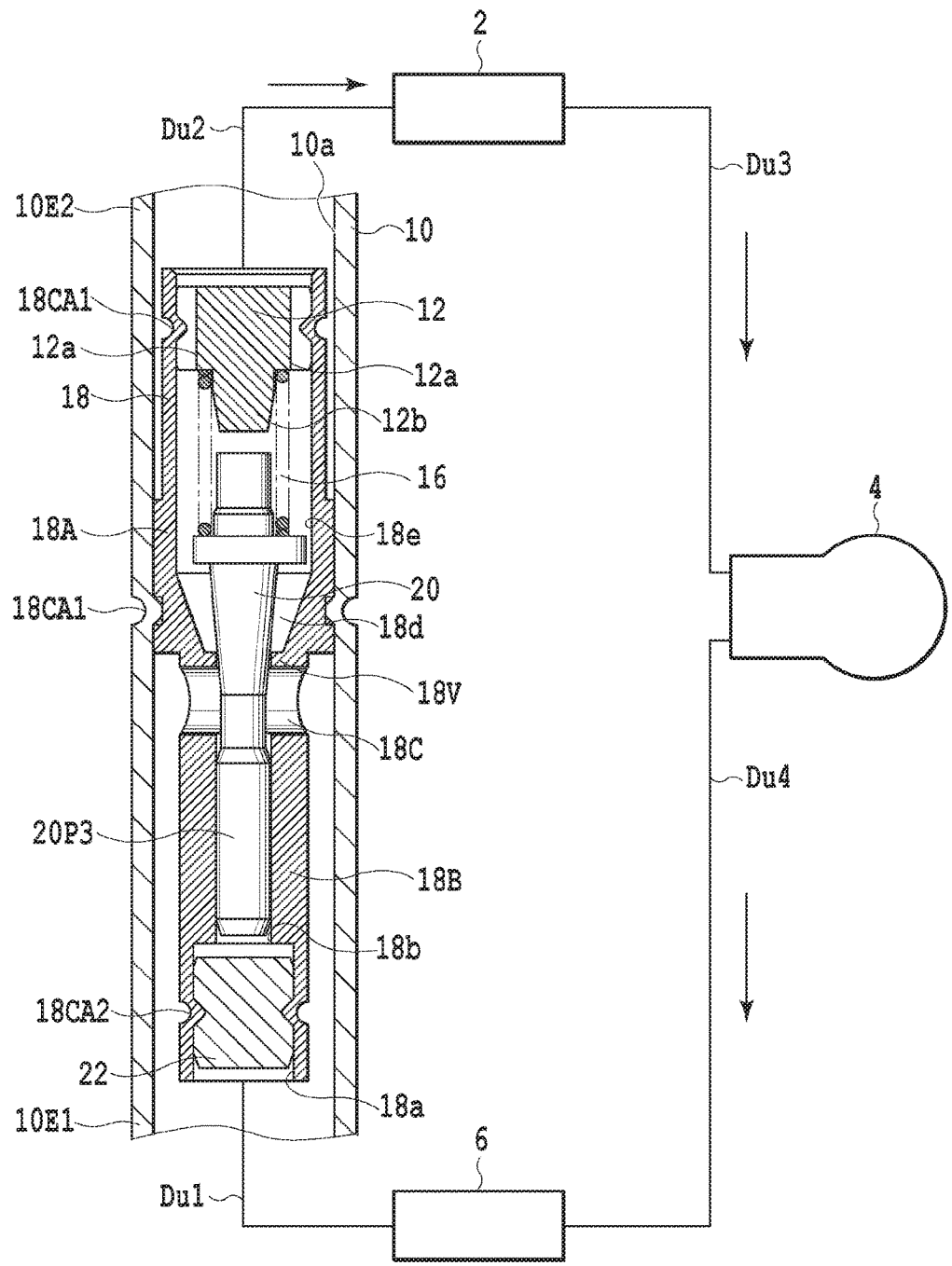
FIG. 2 is a view schematically illustrating the configuration of an example of refrigeration cycle systems to which each embodiment of the throttle device according to the present invention is applied.

The throttle device is disposed between an outlet of a condenser 6 and an inlet of an evaporator 2 in ducts of the refrigeration cycle system as illustrated in FIG. 2, for example. The throttle device is joined to a primary duct Du1 at one end 10E1 of a later-described tube body 10 and is joined to a secondary duct Du2 at the other end 10E2 of the tube body 10, through which a refrigerant is discharged. The primary duct Dub connects the outlet of the condenser 6 and the throttle device, and the secondary duct Du2 connects the inlet of the evaporator 2 and the throttle device. As illustrated in FIG. 2, a compressor 4 is connected between the outlet of the evaporator 2 and the inlet of the condenser 6 by a duct Du3 joined to the outlet of the evaporator 2 and a duct Du4 joined to the inlet of the condenser 6. The compressor 4 is driven and controlled by a not-illustrated controller. The refrigerant in the refrigeration cycle system circulates along arrows illustrated in FIG. 2, for example.

As shown in the enlarged view of FIG. 1, the throttle device includes: a tube body 10 joined to the ducts of the aforementioned refrigeration cycle system; a guide tube 18 which is fixed to inner circumferential part of the tube body 10; a valve seat 18V constituting a refrigerant flow rate regulator which is integrally formed at an end of the guide tube 18 closer to the primary duct Du1 and regulates the flow rate of the refrigerant; a needle member 20; a coil spring 16 which energizes the needle member 20 toward the valve seat 18V; a spring receiving member 12 which supports an end of the coil spring 16; and a stopper member 22 which receives the end face of a later-described guide stem section 20P3 of the needle member 20 as main components.

The tube body 10 including predetermined length and diameter is composed of a copper pipe, a stainless steel pipe, or an aluminum pipe, for example. The one end 10E1 of the tube body 10 through which the refrigerant is introduced is joined to the primary duct Du1 connected to the condenser 6 while the other end 10E2 through which the refrigerant is discharged is joined to a secondary duct Du2 connected to the evaporator 2.

In the middle of the inner circumferential part of the tube body 10 at a predetermined distance from the one end 10E1, the outer circumferential part of a fixed section 18A of the guide tube 18 is fixed. The guide tube 18 has an outer diameter smaller than the inner diameter of the tube body 10. The guide tube 18 is fixed in such a manner that a protrusion formed with a dent 10CA1 of the tube body 10 by swaging digs into the outer circumferential part of the fixed section 18A.

The guide tube 18 is machined from a material such as copper, brass, aluminum, or stainless steel, for example. The guide tube includes the spring receiving member 12 in the inner circumferential part of the end of the fixed section 18A closest to the other end 10E2 of the tube body 10. The guide tube 18 includes the stopper member 22 on the inner circumferential part of the end of the guide section 18B closest to the one end 10E1 of the tube body 10. The aforementioned guide section 18B of the guide tube 18 and the fixed section 18A of the guide tube 18 are integrally formed.

The guide section 18B is formed in a part on the upstream side of a later-described communicating hole 18c in the guide tube 18. The guide section 18B slidably guides a guide stem section 20P3 of the needle member 20. The guide stem section 20P3 of the needle member 20 is slidably fit to a small-diameter hole 18b communicating with a large-diameter hole 18a of the guide section 18B. A port 18P of the valve seat 18V, the small-diameter hole 18b, and the large-diameter hole 18a in the aforementioned guide tube 18 are formed on a common central axis. Since the aforementioned guide section 18B and fixed section 18A of the guide tube 18 are integrally formed, the port 18P of the valve seat 18V, the small-diameter hole 18b, and the large-diameter hole 18a are easily processed with a high level of accuracy on the common central axis so that the centers thereof coincide.

As illustrated in FIG. 1, the communicating hole 18c is formed just below the valve seat 18V between the valve seat 18V and stopper member 22. The communicating hole 18c penetrates the guide tube 18 in a radial direction thereof to allow communication between the inner circumferential part of the guide tube 18 and gap between the inner circumferential part of the tube body 10 and the outer circumferential part of the guide tube 18.

The valve seat 18V of the guide tube 18 includes the valve port 18P in inner central part thereof. Through the valve port 18P, a later-described tapered section 20P1 of the needle member 20 is inserted. The valve port 18P includes a circular opening that penetrates along the central axis of the valve seat 18V so as to have a predetermined constant diameter. The valve port 18P is not limited to the above example and may be configured to penetrate along the central axis of the valve seat 18V so as to increase in diameter towards the one end 10E1.

On the downstream side of the valve seat 18B in the guide tube 18, a conical section 18d is formed within the fixed section 18P. The conical section 18d has an inner diameter gradually increasing toward the downstream side, starting from the diameter of the valve port 18P. The conical section 18d is provided with an overhang section 20F of the needle member 20.

The spring receiving member 12 is fixed in such a way that the protrusion formed with a dent 18CA1 of the cylindrical fixed section 18A in the guide tube 18 by swaging digs into the outer circumferential section thereof. The spring receiving member 12 as an urging member support includes a spring guide section 12b, which is engaged with an end of the coil spring 16. The spring receiving member 12 includes flat faces 12a in part of the outer circumferential surface thereof. The flat faces 12a are spaced and face each other. A refrigerant flow channel is thereby formed between the inner circumferential surface of the guide tube 18 and each flat face 12a of the spring receiving member 12.

The stopper member 22 is fixed to the large-diameter hole 18a of the guide section 18B of the guide tube 18. The stopper member 22 is fixed in such a manner that a protrusion formed with a dent 18CA2 in the guide section 18B of the guide tube 18 by swaging digs into the outer circumferential part of the stopper member 22. The large-diameter hole 18a of the guide section 18B is thereby almost filled with the stopper member 22. The stopper member 22 is made of a metal material and has a substantially circular cross-section, for example. The both end faces of the stopper member 22, which are perpendicular to the flow of the refrigerant, are substantially flat. One of the both end faces of the stopper member 22 touches on an end face of a guide stem section 20P3 of the needle member 20 when the tapered section 20P1 of the needle member 20 comes close to the valve port 18P.

Figure 3A:
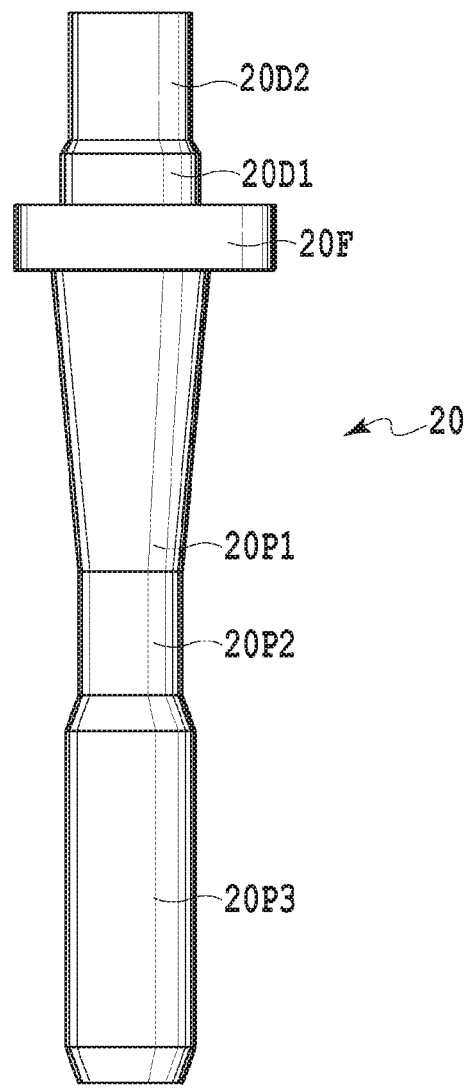
FIG. 3A is a front view illustrating a needle member used in the example illustrated in FIG. 1.

The needle member 20 as a valve member is machined from a material such as brass or stainless steel, for example. As shown in the enlarged view of FIGS. 3A and 3B, the needle member 20 includes as main elements; the tapered section 20P1 which is formed facing the valve seat 18V; the guide stem section 20P3 which is slidably fit in the small-diameter hold 18b in the aforementioned guide section 18B; a columnar section 20P2 which connects to the tip end of the tapered section 20P1 to connect the tapered section 20P1 and the guide stem section 20P3; a protruding spring guide section 20D1 formed at an end facing the other end of the coil spring 16; and the overhang section 20F which is formed between the spring guide section 20D1 and the base end of the tapered section 20P1.

The minimum diameter of the tapered section 20P1 is set equal to the diameter of the columnar section 20P2. The tapered section 20P1 has a truncated cone shape with a predetermined taper angle. As shown in the enlarged view of FIG. 4A, when the end face of the guide stem section 20P3 touches on the end face of the stopper member 22, the base end of the tapered section 20P1, which has a larger diameter than the diameter of the valve port 18P, is located at a predetermined distance from the valve port 18P. The columnar section 20P2 having constant diameter is formed so as to extend to the minimum diameter section of the tapered section 20P1 by a predetermined length. The length from the position corresponding to the opening end of the valve port 18P in the tapered section 20P1 to the aforementioned columnar section is set to a predetermined length.

The boundary between the guide stem section 20P3, which extends toward the stopper member 22, and the columnar section 20P2 is chamfered.

When the end face of the guide stem section 20P3 touches on the flat end face of the stopper member 22, at the position corresponding to the opening end of the valve port 18P, in the outer circumferential part of the tapered section 20P1 of the needle member 20, the outer circumferential part of the tapered section 20P1 is disposed so as to form a predetermined gap with the peripheral edge of the opening end of the valve port 18P. In such a state, a later-described throttle part is formed between the tapered section 20P1 of the needle member 20 and the opening end of the valve port 18P. When the pressure of the refrigerant within the tube body 10 is not higher than a predetermined pressure, the end face of the guide stem 20P3 touches on the flat face of the stopper member 22 at a predetermined pressure according to the difference between urging force of the coil spring 16 and the pressure of the refrigerant from the primary duct Du1.

The magnitude of the predetermined gap formed at the peripheral edge of the opening end of the valve port 18P determines a predetermined bleed flow rate through the throttle part. The columnar guide stem section 20P3 of the needle member 20 touches on the flat face of the stopper member 22. This prevents the tapered section 20P1 of the needle member 20 from engaging with the opening end of the valve port 18P of the valve seat 18V due to undesired pressure from the secondary side acting on the needle member 20.

The guide stem section 20P3 of the needle member 20 is formed upstream of the valve seat 18V (valve port 18P) and communicating hole 18c, so that the guide section 18B is located within the liquid refrigerant comparatively stable. Accordingly, very little abrasion powder is produced at the guide portion 18B. Moreover, the large-diameter hole 18a of the guide section 18B is almost filled with the stopper member 22, further preventing substances which are eluted and formed from components contained in the refrigerant or refrigerator oil, abrasion powder, or compounds of the eluted substances and abrasion powder adhering to and depositing on the guide stem section 20P3 and valve seat 18V. Furthermore, since the large-diameter hole 18a of the guide section 18B is almost filled with the stopper member 22, foreign substances contained in the refrigerant from the upstream side are prevented from entering the gap between the outer circumferential part of the guide stem section 20P3 and the inner circumferential part of the guide section 18B.

Figure 3B:
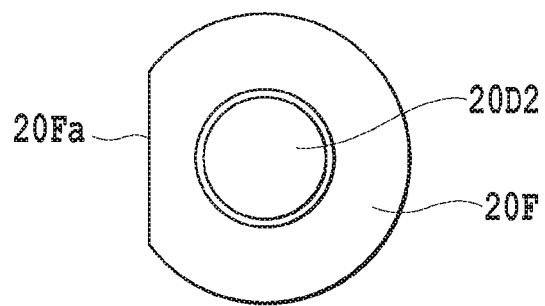
FIG. 3B is a top view illustrating the needle member illustrated in FIG. 3A.

The overhang section 20F of the needle member 20 has a substantially annular shape so as to form a D-shaped profile as illustrated in FIG. 3B. The overhang section 20F has a flat face 20Fa at a predetermined distance from the central axis so as to cross the annular part. The flat face 20Fa is formed along the thickness direction of the annular part from end to end in the overhang section 20F. The shape of the overhang section 20F is not limited to the above example. The overhang section 20F may have a substantially annular shape so as to form a polygonal profile or form a circular profile including at a place, a protrusion that protrudes towards the inner circumferential surface 18e of the guide tube 18.

In the differential pressure-type throttle device, the valve body is subject to microvibration due to cavitation caused in the flow channel of the refrigerant cycle system or pulsation of the refrigerant. Such microvibration of the valve body could cause abnormal sound (noise) in some cases.

With the first embodiment of the throttle device according to the present invention, while the needle member 20 is moving, operating pressure of the refrigerant between the inner circumferential surface 18e of the guide tube 18 and the flat face 20Fa acts on the overhang section 20F in the radial direction to press the overhang section 20F and tapered section 20P1 toward the inner circumferential surface 18e according to the difference between the pressure between the inner circumferential surface 18e of the guide tube 18 and the flat surface 20Fa and the inner circumferential surface 18e and other part facing the flat face 20Fa. In other words, the difference in pressure produced by the gap formed between the inner circumferential surface 18e of the guide tube 18 and the flat face 20Fa and the gap formed between the inner circumferential surface 18e and the other part of the overhang section 20 facing the flat face 20Fa presses a part of the outer circumferential surface of the aforementioned overhang section 20F toward the inner circumferential surface 18e of the guide tube 18. The reaction force acts on the guide section 18B and guide stem section 20P3, reducing microvibration of the needle member 20. This prevents occurrence of abrasion at the valve port 18P and abnormal sound.

The overhang section 20F is disposed near the maximum diameter part of the conical section 18d where the flow rate of the refrigerant is the highest. Accordingly, even when the opening area of the aforementioned throttle part increases sharply and the primary-side pressure decreases, the overhang section 20F reduces the change in pressure within the conical section 18d, thus preventing occurrence of a hunting phenomenon. In other words, the first embodiment does not require a wing illustrated in Japanese Patent No. 4041406.

The spring guide section 20D1 of the needle member 20 is engaged with the other end of the oil spring 16. One end of the coil spring 16 is engaged with the spring guide section 12b of the spring receiving member 12. The touching section 20D2 extending to the spring guide section 20D1 is separated a predetermined distance from the top end of the spring guide section 12b. If the needle member 20 is moved a predetermined value or more toward the spring guide section 12b, the end face of the touching section 20D2 touches on the top end of the spring guide section 12b, so that the movement of the needle member 20 is limited. The coil spring 16 is therefore prevented from excessively compressed to a predetermined value or more.

Separation starting time when the outer circumferential part of the tapered section 20P1 of the needle member 20 starts to further separate from the peripheral edge of the opening end of the valve port 18P due to the differential pressure (the difference between inlet pressure of the refrigerant on the one end 10E1 side and outlet pressure of the refrigerant on the other end 10E2 side) is set based on the urging force of the coil spring 16. The spring constant of the coil spring 16 is set to a predetermined value.

When the end face of the guide stem section 20P3 touches on the stopper member 22, urging force by the coil spring 16 in the valve closing direction acts on the touching surface between the stopper member 22 and guide stem section 20P3.

The urging force of the coil spring 16, that is, the referential height (set length) of the coil spring 16 corresponding to each refrigerant is adjusted in the following procedure, for example. The referential height refers to a height of the coil spring 16 which is set so that the tapered section 20P1 of the needle member 20 starts to separate at the aforementioned predetermined separation time corresponding to each refrigerant.

First, in the case of fixing the stopper member 22 to the inner circumferential part 18a of the guide tube 18, the guide stem section 20P3 of the needle member 20 is first inserted into the small-diameter hole 18b of the guide section 18B of the guide tube 18. The needle member 20 is then pressed against the valve seat 18V by using a coil spring or the like. Subsequently, the guide tube 18 in which the stopper member 22 is inserted is placed in a bleed airflow meter/swaging device (not illustrated) using air as the fluid, for example.

The position of the stopper member 22 relative to the guide tube 18 is then adjusted so that the air flow rate equal to the target bleed flow rate. The stopper member 22 is then swaged and fixed to the guide tube 18. The adjustment of the bleed flow rate is thus completed.

To fix the spring receiving member 12, the guide tube 18 with the stopper member 22 fixed thereto is placed in a predetermined performance measurement/swaging device (not illustrated) using air as the fluid, for example. The position of the spring receiving member 12 relative to the guide tube 18 is then adjusted based on detection of the air flow rate in the presence of pressure previously specified. Thereafter, the spring receiving member 12 is swaged and fixed, thus completing adjustment of the length of the coil spring 16.

That eliminates the need for an adjustment screws or the like used for adjusting the length of the coil spring 16, so that the valve opening starting pressure corresponding to each refrigerant can be adjusted. Moreover, it is possible to simplify the structure of the throttle device, reducing the manufacturing cost.

Figure 4A:
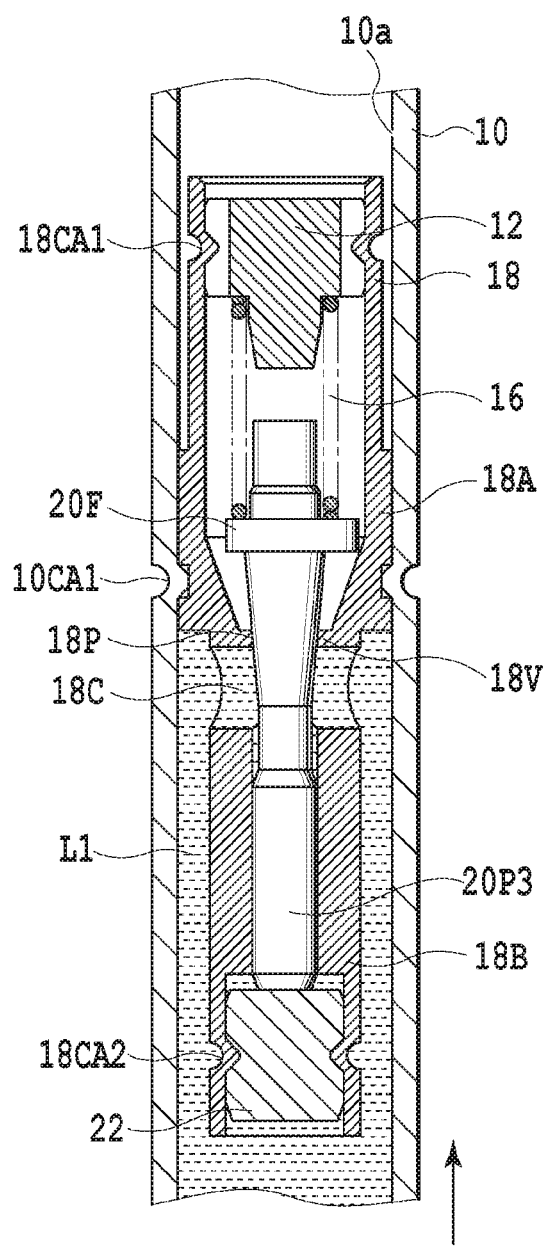
FIG. 4A is a cross-sectional view made available for explaining the operation of the example illustrated in FIG. 1.

In the above-described configuration, when the refrigerant is supplied through the primary duct Du1 along the direction indicated by the arrows in FIG. 2 and the force acting on the needle member 20 due to pressure of the refrigerant does not exceed the urging force of the coil spring 16, as illustrated in FIG. 4A, the refrigerant passes through the one end 10E1 of the tube body 10, between the inner circumferential part 10a of the tube body 10 and the outer circumferential part of the guide tube 18, the through-path 18c, and the above-described throttle part, so that the pressure of the refrigerant is reduced. The refrigerant then passes between the inner circumferential surface of the fixed section 18A of the guide tube 18 and the flat surface 12a of the spring receiving member 12 to be discharged from the other end 10E2 at a predetermined bleed flow rate.

Figure 4B:
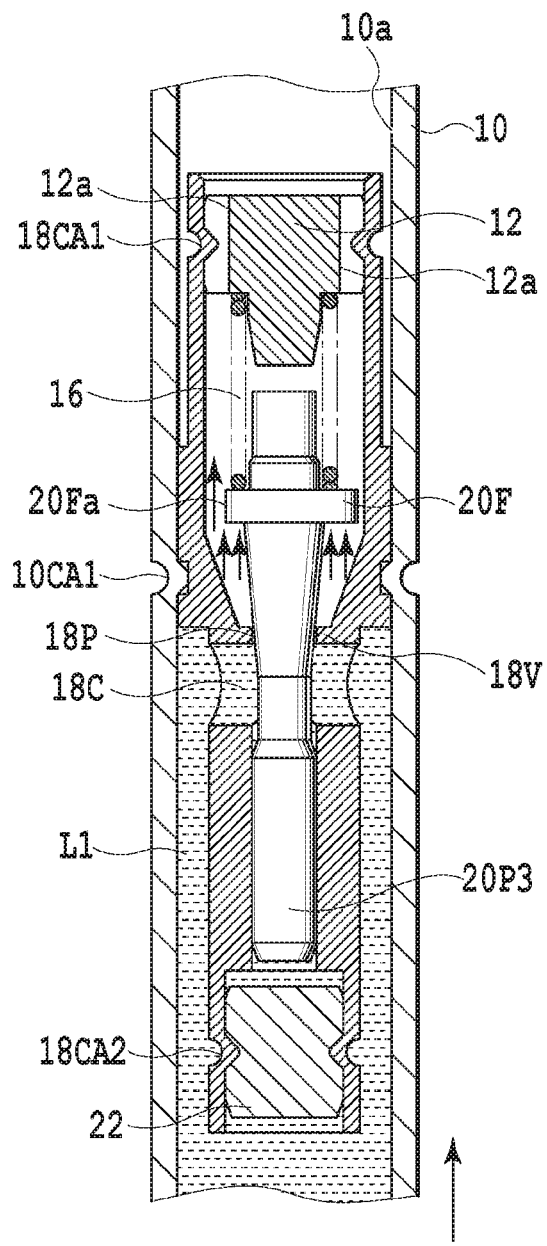
FIG. 4B is a cross-sectional view made available for explaining the operation of the example illustrated in FIG. 1.
Figure 5:
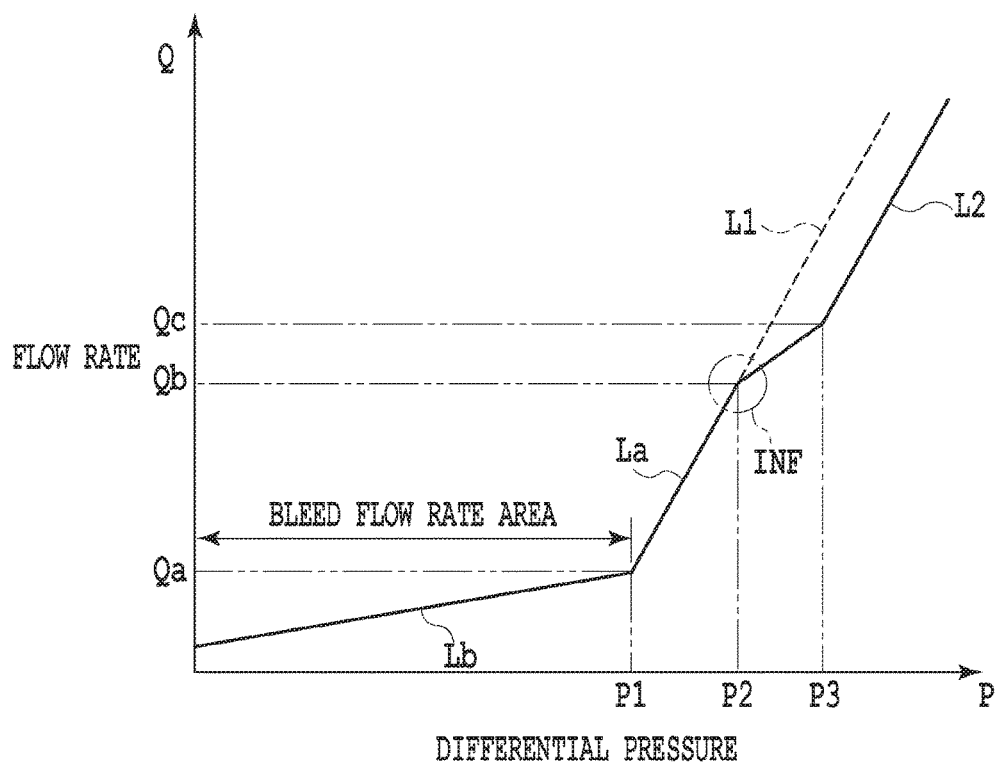
FIG. 5 is a characteristic diagram illustrating flow rate characteristic lines made available for explaining the operation of the example illustrated in FIG. 1.

When the force acting on the needle member 20 due to pressure of the refrigerant exceeds the urging force of the coil spring 16, as illustrated in FIG. 4B, the refrigerant flowing through the above-described throttle part presses the needle member 20 in a direction further away from the peripheral edge of the valve port 18P. Accordingly, the flow rate Q of the refrigerant, that is, the bleed flow rate gradually increases along characteristic line Lb with differential pressure P as illustrated in FIG. 5. When the differential pressure P increases to a predetermined value P1 and the flow rate Q increases to a predetermined value Qa or more, for example, the flow rate increases rapidly along characteristic line La with the differential pressure P.

The outer circumferential part of the tapered section 20P1 of the needle member 20 is located away from the peripheral edge at the opening end of the valve port 18P as described above, the throttle part is formed between tapered section 20P1 of the needle member 20 and the opening end of the valve port 18P. The degree of opening of the throttle part is variable according to the refrigerant pressure. The throttle part is defined as a part (the narrowest part) where intersections of perpendiculars to the generatrix of the tapered section 20P1 from the peripheral edge of the valve port 18P and the generatrix of the tapered section 20P1a are the closest from the edge of the valve port 18P. The area of the conical surface drawn by the above perpendiculars is referred to as the opening area of the throttle part. The same calculation of the opening area applies to the gap formed between the outer circumferential part of the tapered section 20P1 and the peripheral edge of the opening end of the valve port 18P when the force acting on the needle member 20 due to the refrigerant pressure does not exceed the urging force of the coil spring 16.

Figure 6A:
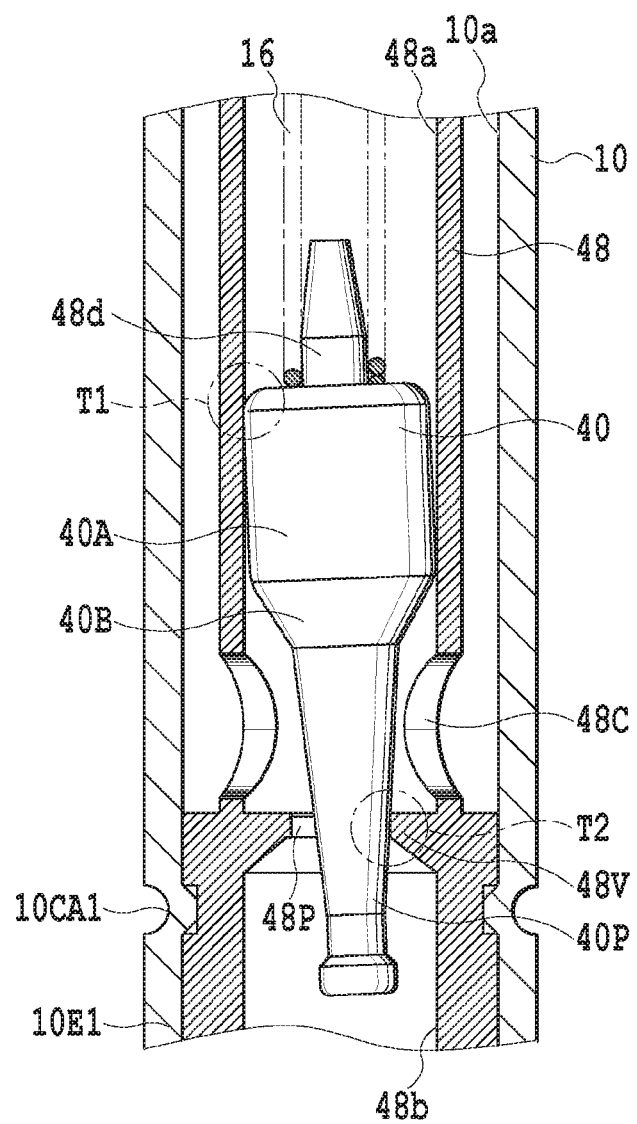
FIG. 6A is a partial cross-sectional view made available for explaining the operation of a comparative example.

In the case where the outer circumferential part of the tapered section of a needle member is spaced from the peripheral edge of the valve port as described above, in a comparative example illustrated in FIG. 6A, for example, the posture of a needle member 40 inclines at a comparatively small angle with respect to an inner circumferential surface 48a of a guide tube 48 of the needle member in accordance with a change in gap between the outer circumferential surface of a body section 40A of the needle member 40 and an inner circumferential surface 48a of the guide tube 48 in some cases. In FIG. 6A, the same constituent elements in the example illustrated in FIG. 1 are given the same reference numerals, and the redundant description thereof is omitted.

In FIG. 6A, the guide tube 48 is machined from a material such as copper, brass, aluminum, or a stainless steel, for example. The guide tube 48 includes a spring receiving member (not illustrated) on the inner circumferential part of the end of the guide tube 48 closest to the other end 10E2 of the tube body 10. A valve seat 48V of the guide tube 48 and a fixed section of the guide tube 48 are integrally formed. Between the valve seat 48V and the aforementioned spring receiving member, a communicating hole 48c is formed just above the valve seat 48V. The communicating hole 48c penetrates the guide tube 48 in a radial direction to allow communication between the inner circumferential part of the guide tube 48 and part between the outer circumferential part of the tube body 10 and the outer circumferential part of the guide tube 48. The valve seat 48V of the guide tube 48 includes a valve port 48P at the inner central part. Through the valve port 48P, a later-described tapered section 40P of the needle member 40 is inserted. The valve port 48P has predetermined diameter and is formed so as to increase in diameter toward the one end 10E1 along the central axis of the valve seat 48V. The needle member 40 is made of brass or stainless steel, for example. The needle member 40 includes: the columnar body section 40A; the tapered section 40P which is formed at an end of the body section 40A facing the valve seat 48V; and a protrusion-shaped spring guide section 48d which is formed at an end of the body section 40A facing the other end of the coil spring 16. In the boundary of the body section 40A and tapered section 40P, a chamfered section 40B is formed.

In such a case, the upper edge (the shoulder) of the outer circumferential part of the body section 40A of the needle member 40 comes into sliding contact with the inner circumferential surface 48a of the guide tube 48 at a first contact portion T1 while the outer circumferential part of the tapered section 40P of the needle member 40 comes into sliding contact with the peripheral edge of the valve port of the valve seat 48V of the guide tube 48 at a second contact portion T2.

Figure 6B:
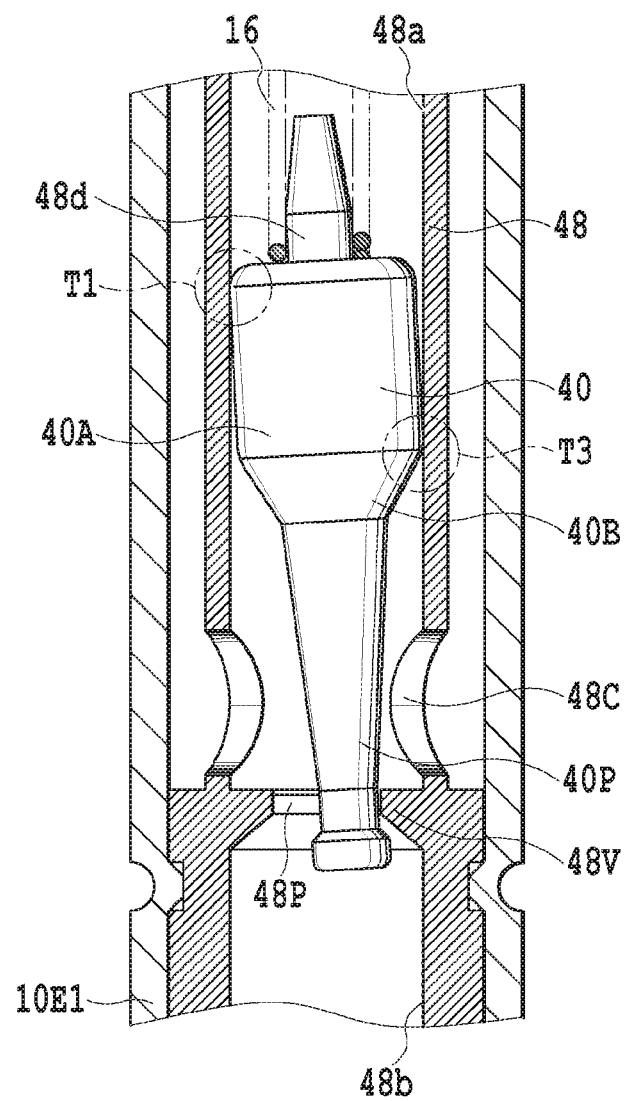
FIG. 6B is a partial cross-sectional view made available for explaining the operation of the comparative example.

Next, for example, when the differential pressure P reaches a predetermined value P2 and the flow rate Q reaches a predetermined value Qb in FIG. 5, the refrigerant flowing through the aforementioned throttle part presses the needle member 40 in a direction further away from the peripheral edge of the valve port 48P as illustrated in FIG. 6B. In this process, the posture of the needle member 40 sometimes inclines at a larger angle with respect to the inner circumferential surface 48a of the guide tube 48 in accordance with the gap between the outer circumferential surface of the body section 40A of the needle member 40 and the inner circumferential surface 48a of the guide tube 48 in some cases. In such a case, the upper edge (the shoulder) of the outer circumferential part of the body section 40A of the needle member 40 comes into sliding contact with the inner circumferential surface 48a of the guide tube 48 at the aforementioned first contact portion T1 while the lower edge of the outer circumferential part of the body section 40A of the needle member 40 comes into sliding contact with the inner circumferential surface 48a of the guide tube 48 at a third contact portion T3. This degrades the slidability of the body section 40A of the needle member 40 on the inner circumferential surface 48a of the guide tube 48, resulting in bad response of the needle member 40. As the differential pressure increases, therefore, the flow rate gradually inflects starting from an inflection point INF, at which the differential value P is P2 and the flow rate is Qb, along characteristic line L2, which has a smaller gradient than that of the characteristic line La. The flow rate then increases to a flow rate value Qc at a differential pressure value P3 on the characteristic line L2.

On the other hand, according to the first embodiment of the throttle device of the present invention, even when the differential pressure and flow rate further increase beyond the differential pressure value P2 and the flow rate value Qb, respectively, the guide section 18B of the guide tube 18 and the guide stem section 20P3 of the needle member 20 prevent the posture of the needle member 20 from inclining undesirably. Accordingly, the flow rate linearly and steeply increases in proportion to the differential pressure along characteristic line L1, which is an extension of the characteristic line La, instead of gradually increasing with the differential pressure due to the aforementioned undesired infection point.

FIG. 5 illustrates the characteristic lines representing changes in flow rate with differential pressure of the refrigerant in the comparative example illustrated in FIGS. 6A and 6B and the first embodiment of the throttle device according to the present invention. In FIG. 5, the vertical line represents the flow rate Q of the refrigerant passing through the aforementioned throttle part while the horizontal axis represents the aforementioned differential pressure P of the refrigerant.

Figure 7:
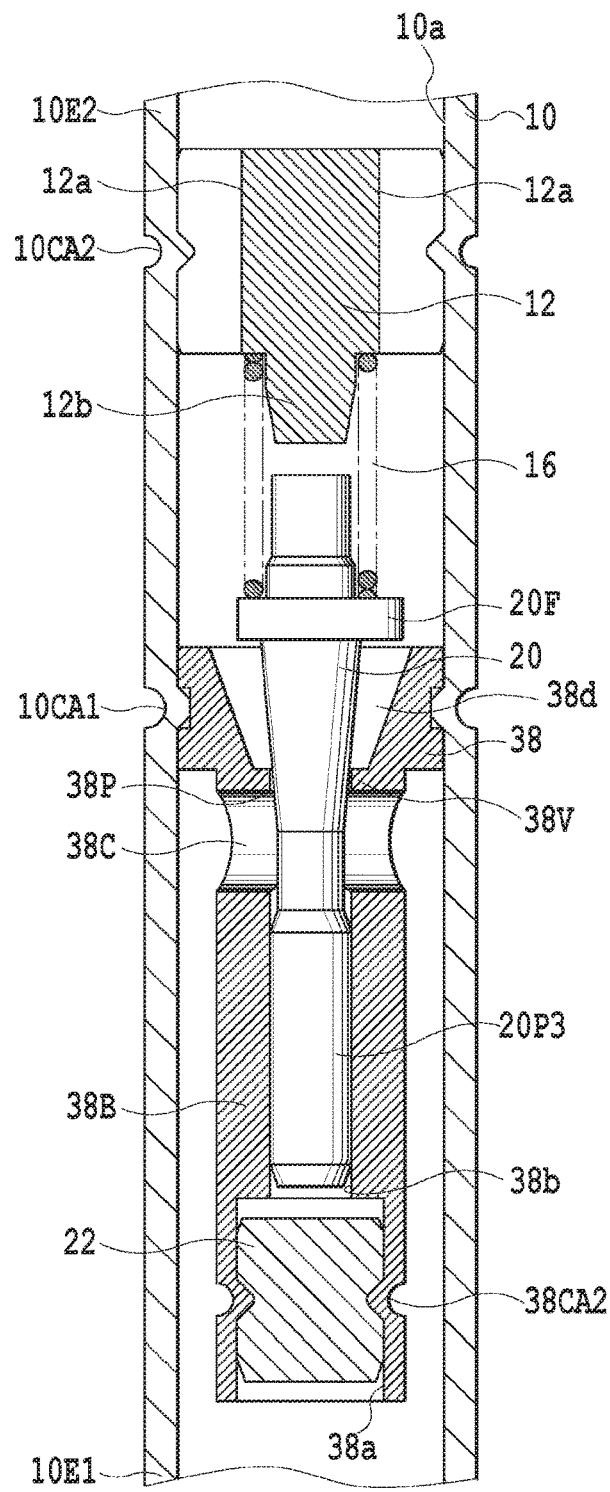
FIG. 7 is a cross-sectional view illustrating the configuration of a second embodiment of the throttle device according to the present invention.

FIG. 7 illustrates a configuration of a second embodiment of the throttle device of the present invention which is applied to an example of refrigeration cycle systems.

In the example illustrated in FIG. 1, the guide tube 18, which includes the integrally-formed guide section 18B and the fixed section 18A having a spring receiving section, is fixed to the inner circumferential part 10a of the tube body 10 at one place. In the example illustrated in FIG. 7, instead, the spring receiving section is fixed to the inner circumferential section 10a of the tube body 10, and the guide tube 38 is fixed to another part of the inner circumferential section 10a. In FIG. 7, the same constituent elements as those in the example illustrated in FIG. 1 are given the same reference numerals, and the redundant description thereof is omitted.

The throttle device is provided between the outlet of the condenser 6 and the inlet of the evaporator 2 in the ducts of the refrigeration cycle system as illustrated in FIG. 2 similarly to the above-described example, for example.

The throttle device includes: the tube body 10 joined to ducts of the aforementioned refrigeration cycle system; a guide tube 38 which is fixed to the inner circumferential part of the tube body 10; a valve seat 38V constituting a refrigerant flow rate regulation section which is integrally formed at an end of the guide tube 38 closer to the primary duct Du1 and regulates the flow rate of the refrigerant; the needle member 20; the coil spring 16 which energizes the needle member 20 in a direction toward the valve seat 38V; the spring receiving member 12 which supports the one end of the coil spring 16; and the stopper member 22 which receives the end face of the guide stem section 20P3 of the needle member 20 as main components.

In middle part of the inner circumferential part of the tube body 10 at a predetermined distance from the one end 10E1, the outer circumferential part of a fixed section of the guide tube 38 is fixed. The guide tube 38 has an outer diameter smaller than the inner diameter of the tube body 10. The guide tube 38 is fixed in such a manner that a protrusion formed with the dent 10CA1 of the tube body 10 by swaging digs into the outer circumferential part of the fixed section. The spring receiving member 12 is fixed to the inner circumferential part of the end closest to the other end 10E2 of the tube body 10. The spring receiving member 12 is fixed in such a manner that the protrusion formed with the cylindrical dent 10CA2 in the tube body 10 by swaging digs into the outer circumferential part.

The guide tube 38 is machined from a material such as copper, brass, aluminum, or a stainless steel, for example. The guide tube 38 includes the stopper member 22 in the inner circumferential part of the end of the guide section 38B closest to the one end 10E1 of the tube body 10.

The guide section 38B is formed upstream of a later-described communicating hole 38c in the guide tube 38. The guide section 38B slidably guides the guide stem section 20P3 of the needle member 20. The guide stem section 20P3 of the needle member 20 is slidably fit to a small-diameter hole 38b communicating with a large-diameter hole 38a of the guide section 38B. A port 38P of the valve seat 38V, the small-diameter hole 38b, and the large-diameter hole 38a in the guide tube 38, are formed on a common central axis. Since the aforementioned guide section 38B and fixed section of the guide tube 38 are integrally formed, the port 38P of the valve seat 38V, the small-diameter hole 38b, and the large-diameter hole 38a are easily processed with a high level of accuracy on the common central axis so that the centers thereof coincide.

The communicating hole 38c is formed just below the valve seat 38V between the valve seat 38V and stopper member 22. The communicating hole 38c penetrates the guide tube 38 in a radial direction thereof to allow communication between the inner peripheral part of the guide tube 38 and gap between the inside circumferential part of the tube body 10 and the outer circumferential part of the guide tube 38.

The valve seat 38V of the guide tube 38 includes the valve port 38P in the inner central part. Through the valve port 38P, the tapered section 20P1 of the needle member 20 is inserted. The valve port 38P includes a circular opening that penetrates along the central axis of the valve seat 38V so as to have predetermined constant diameter. The valve port 38P is not limited to the above example and may be configured to penetrate along the central axis of the valve seat 38V so as to increase in diameter toward the one end 10E1.

On the downstream side of the valve seat 38V in the guide tube 38, a conical section 38d is formed within the fixed section. The inner diameter of the conical section 38d increases, starting from the diameter of the valve port 38P, toward the downstream side. In the conical section 38d, the overhang section 20F of the needle member 20 is provided.

In the above-described configuration, when the refrigerant is supplied through the primary duct Du1 along the direction indicated by the arrows in FIG. 2 and the force acting on the needle member 20 due to pressure of the refrigerant does not exceed the urging force of the coil spring 16, the refrigerant passes through the one end 10E1 of the tube body 10, gap between the inner circumferential part 10a of the tube body 10 and the outer circumferential part of the guide section 38B of the guide tube 38, through the communicating path 38c, and through the above-described throttle part, so that the pressure of the refrigerant is reduced. The refrigerant then passes between the inner circumferential surface 10a of the tube body 10 and the flat surface 12a of the spring receiving member 12 to be discharged from the other end 10E2 at a predetermined bleed flow rate.

When the force acting on the needle member 20 due to pressure of the refrigerant exceeds the urging force of the coil spring 16, the refrigerant flowing through the above-described throttle part presses the needle member 20 in a direction away from the peripheral edge of the valve port 38P. Accordingly, the flow rate Q of the refrigerant, that is, the bleed flow rate gradually increases along the characteristic line Lb with the differential pressure P as illustrated in FIG. 5. When the above-described differential pressure P increases to the predetermined value P1 and the flow rate Q increases to a predetermined value Qa or more, for example, the flow rate increases steeply along the characteristic line La with the differential pressure P.

Subsequently, even when the differential pressure and flow rate further increase beyond the differential pressure value P2 and the flow rate value Qb in FIG. 5, respectively, the guide section 38B of the guide tube 38 and the guide stem section 20P3 of the needle member 20 prevents the posture of the needle member 20 from inclining undesirably. Accordingly, the flow rate linearly and steeply increases in proportion to the differential pressure along the characteristic line L1, which is the extension of the characteristic line La, instead of gradually increasing with the differential pressure due to the aforementioned infection point.

In the aforementioned example, the guide tube 38 includes the valve seat 38V and guide section 38B integrally. However, the guide tube 38 is not limited to the above example. For example, the valve seat and guide section may be separately formed and may be individually fixed to the inner circumferential part of the tube body 10 to be spaced from each other.

Figure 8:
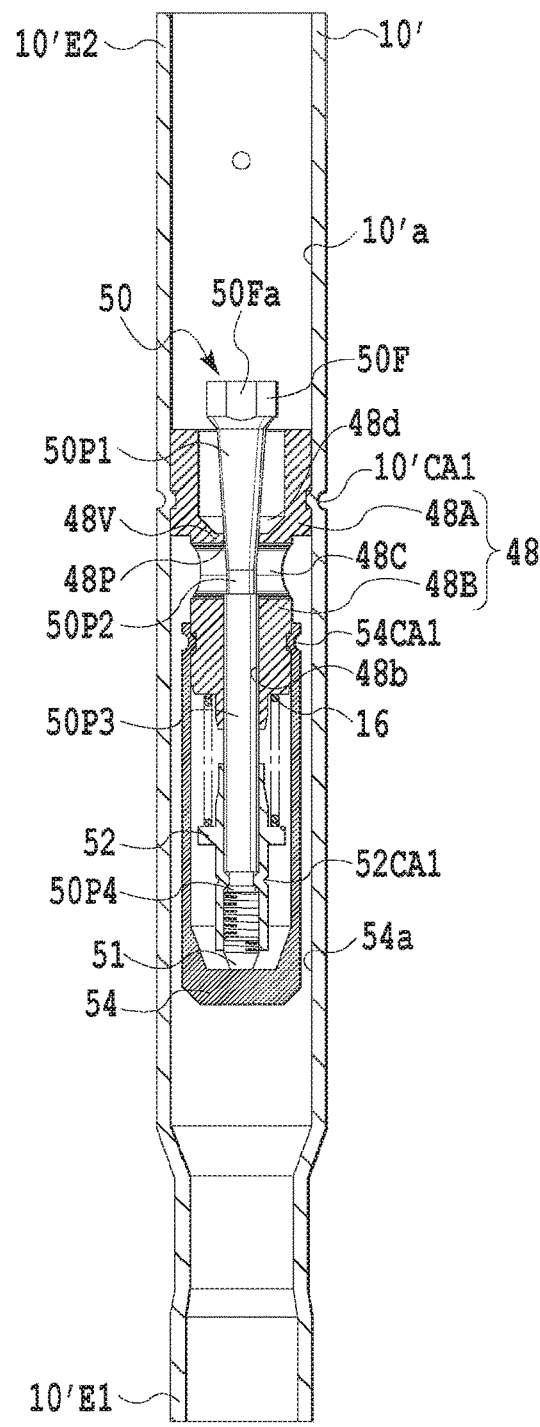
FIG. 8 is a cross-sectional view illustrating the configuration of a third embodiment of the throttle device according to the present invention.

FIG. 8 illustrates the configuration of a third embodiment of the throttle device of the present invention which is applied to an example of the refrigeration cycle system.

In the first and second embodiments described above, the spring receiving member 12 and coil spring 16 are provided downstream of the valve seat. In the example illustrated in FIG. 8, a spring receiving member 52 and coil spring 16 are provided upstream of the valve seat. In FIG. 8, the same constituent elements as those in the example illustrated in FIG. 1 are given the same reference numerals, and the redundant description thereof is omitted.

The throttle device is provided between the outlet of the condenser 6 and the inlet of the evaporator 2 to the ducts of the refrigeration cycle system as illustrated in FIG. 2 similarly to the above-described example, for example.

The throttle device includes: a tube body 10' joined to the ducts of the aforementioned refrigeration cycle system; the guide tube 48 which is fixed to the inner circumferential part of the tube body 10'; the valve seat 48V which is integrally formed in the guide tube 48 and constitutes a refrigerant flow rate regulation section regulating the flow rate of the refrigerant; a needle member 50; the coil spring 16 which energizes the needle member 50 in a direction toward the valve seat 48V; a spring receiving member 52 which supports an end of the coil spring 16; and a cylindrical stopper member 54 which receives an end of the needle member 50 as main components.

In middle part of the inner circumferential part of the tube body 10' at a predetermined distance from an end 10'E2, the outer circumferential part of a fixed section 48A of the guide tube 48, that has an outer diameter smaller than the inner diameter of the tube body 10' is fixed.

The guide tube 48 is machined from a material such as copper, brass, aluminum, or a stainless steel, for example. The guide tube includes: a fixed section 48A which is fixed in the inner circumferential part of the tube body 10'; and a guide section 48B which slidably guides a guide stem section 50P3 of the later-described needle member 50.

The guide tube 48 is fixed in such a manner that the protrusion formed with a dent 10'CA1 in the tube body 10' by swaging digs into the outer circumferential part of the fixed section 48A.

The guide tube 48 includes a metallic stopper member 54 in the outer circumferential part of an end of the guide 48B that is the closest to the one end 10'E1 of the tube body 10'.

An end of the stopper member 54 is fixed to the guide section 48B in such a manner that the protrusion formed with a dent 54CA1 of the stopper member 54 by swaging digs into the recess at the end of the guide section 48B. The dent 54CA1 by swaging includes a plurality of recesses (three recesses, for example) at predetermined intervals along the circumferential direction of the stopper member 54. The cylindrical stopper member 54 extends toward the one end 10'E1 of the tube body 10' and includes a closed end section at the other end so as to cover the coil spring 16 and spring receiving member 52. The closed end section includes a flat inner surface. The inner surface is configured to receive the end face of an adjustment screw 51 that is formed integrally with an end of the needle member 50 and is screwed into a female thread at an end of the spring receiving member 52. A predetermined gap is formed between the inner circumferential surface of part other than the dent 54CA1 in the stopper member 54 and the outer circumferential surface of the end of the guide section 48B. Accordingly, the refrigerant supplied from the one end 10'E1 side of the tube body 10' flows through the gap into the inner circumferential part of the stopper member 54.

Even when the primary-side pressure rapidly changes, the pressure within the stopper member accordingly changes. It is therefore possible to provide the degree of opening corresponding to the differential pressure independently of the rate of change in the pressure.

The guide section 48B is formed upstream of the later-described communicating hole 48C in the guide tube 48. The guide stem section 50P3 of the needle member 50A is slidably fit in a hole 48b of the guide section 48B.

The port 48P of the valve seat 48V of the fixed section 48A and the hole 48b of the guide tube 48 are formed on a common central axis. In this process, since the guide section 48B and fixed section 48A of the guide tube 48 are integrally formed, the port 48P of the valve seat 48V and the hole 48b are easily processed with a high level of accuracy on the common central axis so that the centers thereof coincide.

Between the valve seat 48V of the guide section 48A and the guide section 48B, the communicating hole 48C is formed just below the valve seat 48V. The communicating hole 48C penetrates the guide tube 48 in a radial direction thereof to allow communication between the port 48P and part between the outer circumferential part of the guide tube 48 and the inner circumferential part of the tube body 10.

The valve seat 48V of the fixed tube 48 includes the valve port 48P in the inner central part. Through the valve port 48P, a tapered section 50P1 of the needle member 50 is inserted. The valve port 48P includes a circular opening that has a predetermined constant diameter and penetrates along the central axis of the valve seat 48V. The valve port 48P is not limited to the above example and may be configured to penetrate along the central axis of the valve seat 48V so as to increase in diameter towards the one end 10'E1, for example.

Downstream of the valve seat 48V in the guide tube 48, a conical section 48*d* is formed within the fixed section. The conical section 48*d* has an inner diameter which increases, starting from the diameter of the valve port 48P, toward the downstream side.

The needle member 50 is machined from a material such as brass or stainless steel, for example. The needle member 50 includes as main elements; the tapered section 50P1 which is formed facing the valve seat 48V; the guide stem section 50P3 which is slidably fit in the hole 48*b* of the guide section 48B; a columnar section 50P2 which extend to the tip end of the tapered section 50P1 to connect the tapered section 50P1 and the guide stem section 50P3; an overhang section 50F which connects to the base end of the tapered section 50P1; and a spring receiving member joint section 50P4 formed at the tip end of the guide stem section 50P3.

The minimum diameter of the tapered section 50P1 is set equal to the diameter of the columnar section 50P2. The tapered section 50P1 has a truncated cone shape with a predetermined taper angle. When an end of the needle member 50, that is, the tip end of the adjustment screw 51 integrally formed with the spring receiving member joint section 50P4 touches on the inner surface of the closed end section of the stopper member 54, the base end of the tapered section 50P1, which has a larger diameter than the diameter of the valve port 48P, that is, the joint portion with the later-described overhang section 50F is located at a predetermined distance from the valve port 48P. The columnar section 50P2 having a constant diameter is formed so as to extend to the minimum diameter part of the tapered section 50P1 by a predetermined length. The length from the position corresponding to the opening end of the valve port 48P in the tapered section 50P1 to the aforementioned columnar section is set to a predetermined length.

The spring receiving member 52 is swaged and fixed to the spring receiving member joint section 50P4 of the needle member 50. The spring receiving member 52 is fixed in such a manner that a protrusion formed with a dent 52CA1 of the spring receiving member 52 by swaging digs into the spring receiving member joint section 50P4. An end of the coil spring 16 is supported by a spring support section of the spring receiving member 52 facing the aforementioned guide section 48B. The other end of the coil spring 16 is supported by the spring receiving section of the guide section 48B. An touching section extending to the spring receiving section of the guide section 48B and the tip end of the spring support section of the spring receiving member 52 are located away from each other by a predetermined distance. If the needle member 50 is moved toward the other end 10'E2 by a predetermined value or more, the end face of the touching section touches on the tip end of the spring support section, so that the movement of the needle member 50 is limited. The coil spring 16 is therefore prevented from being excessively compressed to a predetermined value or more.

The male thread of the adjustment screw 51 integrally formed with the spring receiving member joint section 50P4 of the needle member 50 is screwed into a female thread hole in the inner circumferential part of the spring receiving member 52. The adjustment screw 51 is configured to adjust the urging force of the coil spring 16. After the urging force of the coil spring 16 is adjusted by the adjustment screw 51, the protrusion formed with the dent 52CA1 of the spring receiving member 52 by swaging digs into the spring receiving member joint section 50P4, so that the position of the adjustment screw 51 relative to the spring receiving member 52 is fixed.

The outer circumferential part of the tapered section 50P1 is provided to when the end face of the adjustment screw 51 touches on the flat inner surface of the closed end section of the stopper member 54, form a predetermined gap with the peripheral edge of the opening end of the valve port 48P at the position corresponding to the opening end of the valve port 48P in the outer circumferential part of the tapered section 50P1 of the needle member 50. Between the tapered section 50P1 of the needle member 50 and the opening end of the valve port 48P, the throttle part is formed. When the pressure of the refrigerant within the tube body 10' is not more than a predetermined value, the end face of the adjustment screw 51 touches on the inner surface of the closed end section of the stopper member 54 at a predetermined pressure according to the difference between the urging force of the coil spring 16 and the pressure of the refrigerant from the primary duct Du1.

The amount of the predetermined gap thus formed at the peripheral edge of the opening end of the valve port 48P determines the predetermined bleed flow rate through the throttle part. Moreover, the end face of the adjustment screw 51 of the spring receiving member 52 of the needle member 50 touches on the inner surface of the closed end section of the stopper member 54. This prevents the tapered section 50P1 of the needle member 50 from engaging with the opening end of the valve port 48P of the valve seat 48V due to the urging force of the coil spring 16 and undesired pressure acting on the needle member 50 from the secondary side.

The guide stem section 50P3 of the needle member 50 is formed upstream of the valve seat 48V (valve port 48P) and communicating hole 48C. The guide section 48B is therefore located within the liquid refrigerant having a comparatively stable refrigerant state. Accordingly, the guide section 48B does not produce much abrasion powder. Moreover, since the hole 48*b* of the guide section 48B is almost filled with the stopper member 54, it is possible to further prevent substances which are eluted and formed from the components contained in the refrigerant or refrigerator oil, abrasion powder, or compounds of the eluted substances and abrasion powder adhere to and deposit on the guide stem section 50P3 and valve seat 48V. In the case of the third embodiment, in addition to the guide section 48B, the coil spring 16 and spring receiving member 52 are also provided within the stopper member 54, which is located upstream of the valve seat 48V. It is therefore possible to prevent the aforementioned eluted substances, abrasion powder, or compounds of the eluted substances and abrasion powder from adhering to the coil spring 16 and inhibiting the operation thereof. The stopper member 54 has a structure to cover the coil spring 16 and spring receiving member 52, and the liquid refrigerant flows around the coil spring 16 at a comparatively slow speed, preventing occurrence of abnormal sound due to vibration of the coil spring 16. Since the stopper member 54 has a structure to cover the coil spring 16 and spring receiving member 52, it is possible to prevent foreign substances from adhering to the coil spring 16. This provides stable operation performance until the coil spring 16 is compressed to the maximum. Furthermore, it is possible to prevent the coil spring 16 from vibrating due to the flow of the refrigerant to make abnormal sound.

Furthermore, the hole 48b of the guide section 48B is almost filled with the stopper member 54. This can prevent foreign substances contained in the refrigerant from the upstream side from entering the gap between the outer circumferential part of the guide stem section 50P3 and the inner circumferential part of the guide section 48B.

The overhang section 50F of the needle member 50 has a substantially annular shape so as to form a D-shaped profile. The overhang section 50F has a flat face 50Fa at a predetermined distance from the central axis so as to cross the annular part. The flat face 50Fa is formed along the thickness direction of the annular part from end to end in the overhang section 50F. The shape of the overhang section 50F is not limited to the above example. The overhang section 50F may have a substantially annular shape so as to form a polygonal profile or form a circular profile including at a place, a protrusion that protrudes towards the inner circumferential surface of the tube body 10'.

In the aforementioned configuration, when the refrigerant is supplied through the primary duct Du1 along the direction indicated by the arrows in FIG. 2 and the force acting on the needle member 50 due to pressure of the refrigerant does not exceed the urging force of the coil spring 16, the refrigerant passes through the one end 10'E1 of the tube body 10', between the inner circumferential part 10'a of the tube body 10' and the outer circumferential part of the stopper member 54, through the communicating path 48C, and through the above-described throttle part, so that the pressure of the refrigerant is reduced. The refrigerant then passes between the inner circumferential part of the fixed section 48A of the guide tube 48 to be discharged from the other end 10'E2 at a predetermined bleed flow rate.

When the force acting on the needle member 50 due to pressure of the refrigerant exceeds the urging force of the coil spring 16, the refrigerant flowing through the above-described throttle part presses the needle member 50 in a direction away from the peripheral edge of the valve port 48P. Accordingly, the flow rate of the refrigerant rapidly increases along the characteristic line La with the differential pressure P as illustrated in FIG. 5.

In the aforementioned example, the needle member 50 includes the tapered section 50P1 and columnar section 50P2 connected to the guide stem section 50P3. However, the needle member 50 is not limited to the above example and may include a spherical part instead of the tapered section 50P1 as the valve section, for example.

Figure 9:
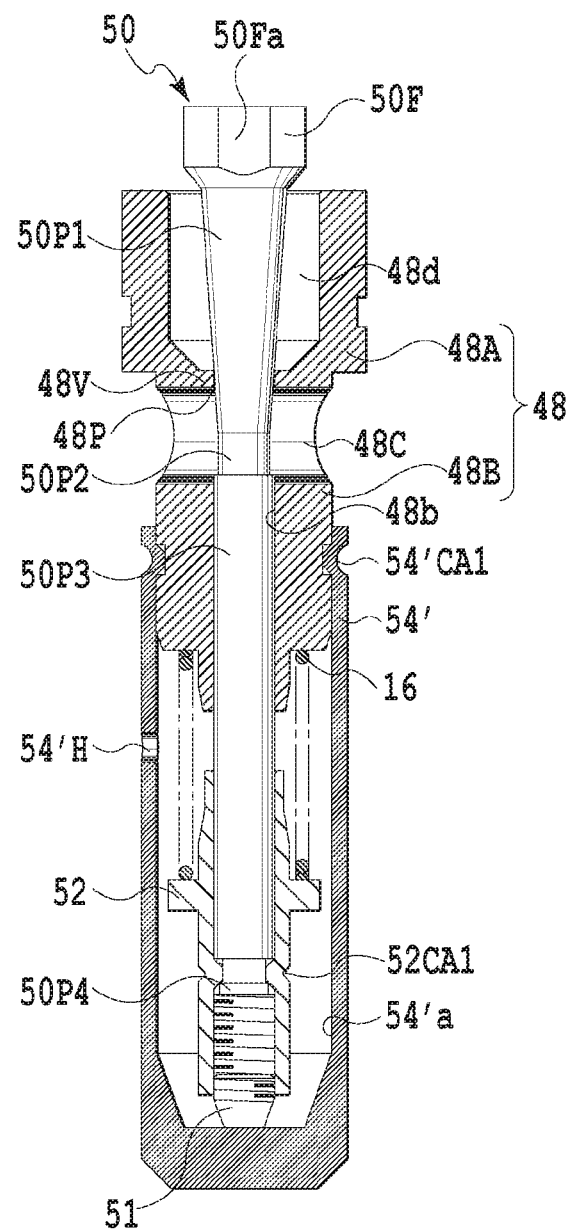
FIG. 9 is a cross-sectional view illustrating another example of a stopper member used in the third embodiment of the throttle device according to the present invention.

In the aforementioned example, an end of the stopper member 54 is fixed to the end of the guide section 48B in such a manner that the protrusion formed with the dent 54CA1 of the stopper member 54 by swaging digs into the recess at the end of the guide section 48B. The dent 54CA1 by swaging includes three dents, for example, at predetermined intervals along the circumferential direction of the stopper member 54 but is not limited to this example. As illustrated in FIG. 9, for example, a dent 54'CA1 of a stopper member 54' may be formed over the entire circumference of the outer circumferential part of the stopper member 54'. In such a case, the stopper member 54' includes a communicating hole 54' H in the cylindrical part. The communicating hole 54'H is configured to allow communication between the inner circumferential part of the tube body 10' and the inner circumferential part of the stopper member 54'. In FIG. 9, the same constituent elements as those in FIG. 8 are given the same reference numerals, and the redundant description thereof is omitted.

The cylindrical stopper member 54' extends toward the one end 10'E1 of the tube body 10' and includes a closed end section at the other end. The closed end section includes a flat inner surface. The refrigerant supplied from the one end 10'E1 side of the tube body 10' therefore flows into the inner circumferential part of the stopper member 54' through the communicating hole 54'H. Even when the primary-side pressure rapidly changes, the pressure within the stopper member accordingly changes. It is therefore possible to obtain the degree of opening according to the differential pressure independently of the rate of change in the pressure.

In this case, the cross-sectional shape of the guide stem section 50P3 of the needle member 50, which slides on the hole 48b of the guide section 48B, may be a substantially cross shape, for example. A flow channel allowing communication between the inside of the stopper member 54' and the valve port 48P is thereby formed between the outer circumferential surface of the guide stem section 50P3 and the inner circumferential surface of the hole 48b.

Figure 10A:
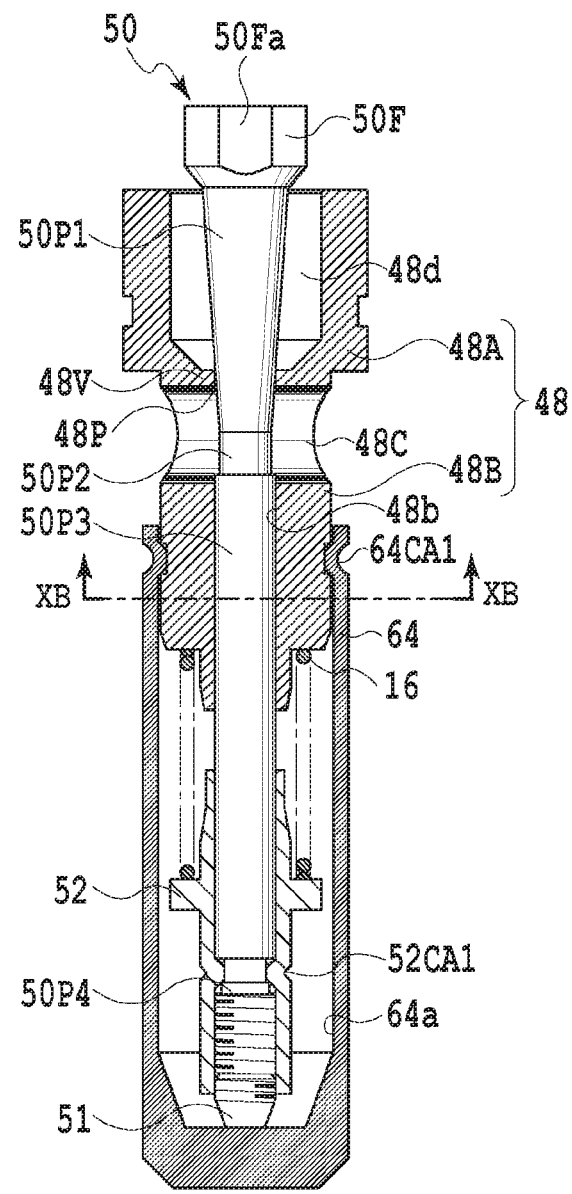
FIG. 10A is a cross-sectional view illustrating still another example of the stopper member used in the third embodiment of the throttle device according to the present invention.
Figure 10B:
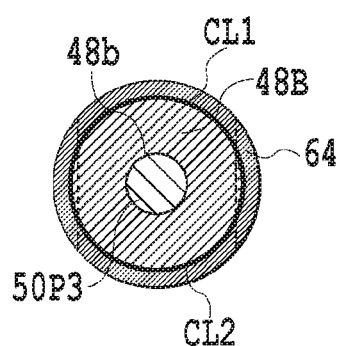
FIG. 10B is a cross-sectional view taken along a line XB-XB in FIG. 10A.

As illustrated in FIGS. 10A and 10B, a stopper member 64 may include two dents 64CA1 by swaging which are located at two positions 180 degrees apart along the circumferential direction of the stopper member 64 so as to face each other. In FIGS. 10A and 10B, the same constituent elements as those in FIG. 8 are given the same reference numerals, and the redundant description thereof is omitted. FIGS. 10A and 10B do not illustrate the tube body 10'. The cylindrical stopper member 64 extends towards the one end 10'E1 of the tube body 10' and includes a closed end section at the other end. The closed end section includes a flat inner surface. In this case, gaps CL1 and CL2 facing each other are formed between the inner circumferential part of the stopper member 64 and the outer circumferential part of the guide section 48B. The refrigerant supplied from the one end 10'E1 side of the tube body 10' therefore flows into the inner circumferential part of the stopper member 64 through the gaps CL1 and CL2. Even when the primary-side pressure rapidly changes, the pressure within the stopper member accordingly changes. It is therefore possible to obtain the degree of opening according to the differential pressure independently of the rate of change in the pressure.

In this case, the cross-sectional shape of the guide stem section 50P3 of the needle member 50, which slides on the hole 48b of the guide section 48B, may be a substantially cross shape, for example. A flow channel allowing communication between the stopper member 64 and valve port 48P is thereby formed between the outer circumferential surface of the guide stem section 50P3 and the inner circumferential surface of the hole 48b.

Figure 11A:
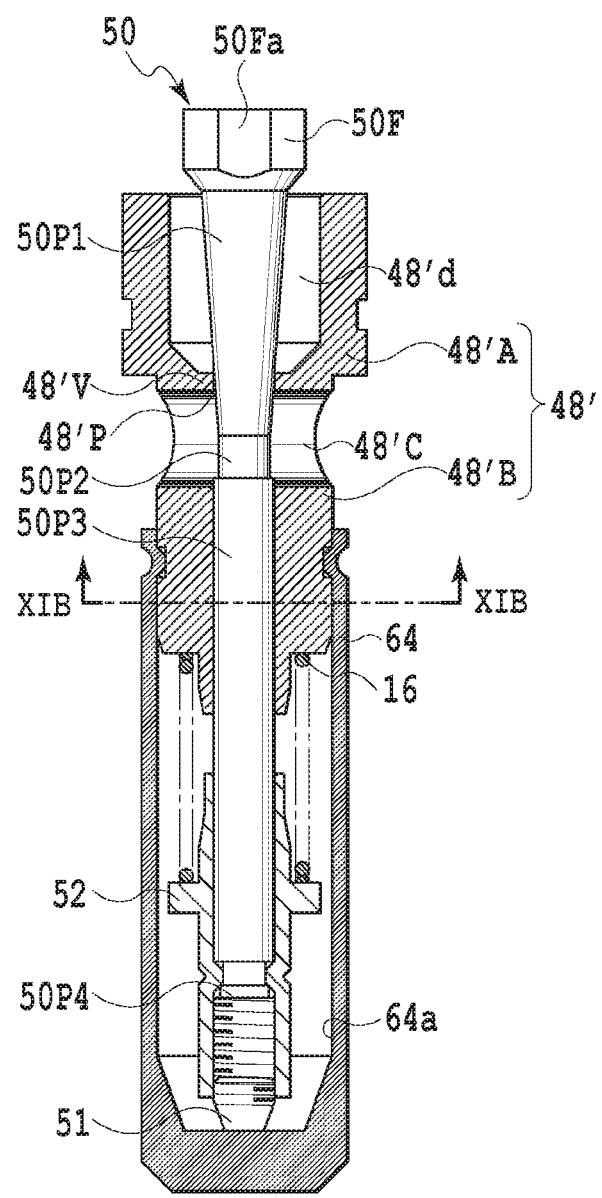
FIG. 11A is a cross-sectional view illustrating still another example of the stopper member used in the third embodiment of the throttle device according to the present invention.
Figure 11B:
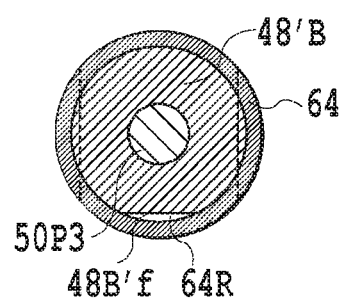
FIG. 11B is a cross-sectional view taken along a line XIB-XIB in FIG. 11A.

Furthermore, when the recesses 64CA1 of the stopper member 64 by swaging are formed at two positions 180 degrees apart along the circumferential direction of the stopper member 64 so as to face each other as described above, as illustrated in FIGS. 11A and 11B, a flat face 48B'f may be formed at a place of the outer circumferential part of a fixed section 48'B of a guide tube 48'. In FIGS. 11A and 11B, the same constituent elements as those in FIGS. 10A and 10B are given the same reference numerals, and the redundant description thereof is omitted.

The guide tube 48' is machined from a material such as copper, brass, aluminum, or stainless steel, for example. The guide tube 48' includes: a fixed section 48'A which is fixed to the inner circumferential part of the tube body 10'; and the guide section 48'B which slidably guides the guide stem section 50P3 of the needle member 50.

The guide tube 48' is fixed in such a manner that the protrusion formed with the dent 10' CA1 in the tube body 10' by swaging digs into the outer circumferential part of the fixed section 48'A.

Between the valve seat 48'V of the fixed section 48'A and the guide section 48B, a communicating hole 48'C is formed just below the valve seat 48'V. The communicating hole 48'C penetrates the guide tube 48' in a radial direction thereof to allow communication between the outer circumferential part of the guide tube 48' and the inner circumferential part of the tube body 10'.

The valve seat 48'V of the guide tube 48' includes a valve port 48'P in the inner central part. Through the valve port 48'P, the tapered section 50P1 of the needle member 50 is inserted. The valve port 48'P includes a circular opening that has a predetermined constant diameter and penetrates along the central axis of the valve seat 48'V. The valve port 48'P is not limited to the above example and may be configured to penetrate along the central axis of the valve seat 48'V so as to increase in diameter towards the one end 10'E1.

Downstream of the valve seat 48'V in the guide tube 48', a conical section 48'*d* is formed within the fixed section 48'A. The conical section 48'*d* has an inner diameter that increases, starting from the diameter of the valve port 48'P, toward the downstream side. The flat face 48B'f is formed at a place of the outer circumferential part of the fixed section 48'A.

In this case, the refrigerant supplied from the one end 10'E1 side of the tube body 10' therefore flows into the inner circumferential part of the stopper member 64 through a flow channel 64R formed between the flat face 48B'f and the inner circumferential part of the stopper member 64. Even when the primary-side pressure rapidly changes, the pressure within the stopper member accordingly changes. It is therefore possible to obtain the degree of opening according to the differential pressure independently of the rate of change in the pressure.

In the example illustrated in FIGS. 11A and 11B, the cross-sectional shape of the guide stem section 50P3 of the needle member 50, which slides on the hole of the guide section 48'B, may be a substantially cross shape, for example. A flow channel allowing communication between the inside of the stopper member 64 and the valve port 48'P is thereby formed between the outer circumferential surface of the guide stem section 50P3 and the inner circumferential surface of the hole.

The invention claimed is:

1. A throttle device, comprising:
   a tube body which is provided in a duct supplying a refrigerant and has opening end sections at both ends, the opening end sections communicating with the inside of the duct;
   a valve seat which is provided on an inner circumferential part of the tube body and has a valve port;
   a valve member including:
      a valve section which is provided to be movable toward and away from the valve port of the valve seat and controls an opening area of the valve port; and
      a guide stem section which is continuous with the valve section and extends toward an upstream side in a flow of the refrigerant;
   a urging member which is provided at an upstream side portion of the valve port and urges the valve member in a direction toward the valve port of the valve seat; and
   a guide section which is provided upstream side of the valve port in the flow of the refrigerant within the tube body and on which the guide stem section of the valve member is slidably provided;
   wherein a stopper member is provided at the guide section, the stopper member including an inner surface which touches on an end face of the guide stem section of the valve member and covers the urging member and a support member supporting the urging member.

2. A refrigeration cycle system, comprising
   an evaporator, a compressor, and a condenser, wherein the throttle device according to claim 1 is provided in a duct located between an outlet of the condenser and an inlet of the evaporator.

3. A throttle device, comprising:
   a tube body which is provided in a duct supplying a refrigerant and has opening end sections at both ends, the opening end sections communicating with inside of the duct;
   a valve seat which is provided on an inner circumferential part of the tube body and has a valve port;
   a needle member including:
      a tapered section which is provided to be movable toward and away from the valve port of the valve seat and controls the opening area of the valve port; and
      a guide stem section which is continuous with a distal end of the tapered section and away from the valve port and extends toward an upstream side in a flow of the refrigerant;
   a urging member which is provided between the needle member and one of the opening end sections of the tube body and urges the needle member in a direction toward the valve port of the valve seat; and
   a guide section which is fixed to the inner circumferential part of the tube body at an upstream side of the valve seat in the flow of the refrigerant and on which the guide stem section of the needle member is slidably provided,
   wherein a stopper member is provided at an end portion of the guide section, the stopper member including an end portion which touches on an end face of the guide stem section of the valve member.

4. The throttle device according to claim 3, wherein the needle member further includes an overhang section which is formed at a proximal end of the tapered section to extend perpendicularly to a direction of the flow of the refrigerant and on which pressure of the refrigerant acts in a direction perpendicular to the direction of the flow of the refrigerant.

5. The throttle device according to claim 4, wherein a difference in pressure is produced between pressure in a first gap and pressure in a second gap, the first gap formed between a first end of the overhang section of the needle member, which extends perpendicularly to the direction of the flow of the refrigerant, and the inner circumferential part of the tube body, the second gap formed between a second end of the overhang section of the needle member which faces the first end of the overhang section of the needle member and the inner circumferential part of the tube body.

6. The throttle device according to claim 3, further comprising a communicating hole which is formed in the guide section and allows the valve port to communicate with a gap between an outer circumferential part of the guide section and the inner circumferential part of the tube body and, wherein at least the guide section, the valve seat, and the communicating hole are integrally formed in a guide tube provided in the inner circumferential part of the tube body.

7. The throttle device according to claim 6, wherein a small-diameter hole of the guide section in which the guide stem section of the needle member is inserted has the same diameter as the valve port of the valve seat each other.

8. A refrigeration cycle system, comprising
an evaporator, a compressor, and a condenser, wherein the throttle device according to claim 3 is provided in a duct located between an outlet of the condenser and an inlet of the evaporator.

* * * * *